United States Patent
Yasuda et al.

[11] Patent Number: 5,974,062
[45] Date of Patent: Oct. 26, 1999

[54] LASER DRIVE METHOD, LASER DRIVE SYSTEM, AND RADIATION IMAGE READ-OUT APPARATUS

[75] Inventors: Hiroaki Yasuda; Hiroaki Hyuga, both of Kanagawa-ken, Japan

[73] Assignee: Fuji Photo Film Co., Ltd., Kanagawa-ken, Japan

[21] Appl. No.: 09/002,248

[22] Filed: Dec. 31, 1997

[30] Foreign Application Priority Data

Jan. 9, 1997 [JP] Japan .................................. 9-001816

[51] Int. Cl.⁶ ........................................................ H01S 3/04
[52] U.S. Cl. .................................. 372/34; 372/36; 372/38
[58] Field of Search ................................ 372/34, 36, 38, 372/21, 22, 24, 29, 99, 107

[56] References Cited

U.S. PATENT DOCUMENTS

| | | | |
|---|---|---|---|
| 5,341,388 | 8/1994 | Masuda et al. | 372/36 |
| 5,499,258 | 3/1996 | Kawano et al. | 372/34 |
| 5,825,793 | 10/1998 | Miyani et al. | 372/33 |
| 5,832,015 | 11/1998 | Goto et al. | 372/34 |

*Primary Examiner*—Hemang Sanghavi
*Attorney, Agent, or Firm*—Sughrue, Mion, Zinn, Macpeak & Seas, PLLC

[57] ABSTRACT

A laser diode pumped solid state laser is provided with a first temperature control circuit which controls the temperature of the laser diode to a predetermined value and a second temperature control circuit which controls the temperature of the resonator of the solid state laser to a predetermined value. When the solid state laser is in a steady state, an automatic power control is carried out for keeping the light output of the solid state laser at a reference output value. When a predetermined command is issued, the automatic power control is switched to an automatic current control for keeping the electric current flowing through the laser diode at a reference current value. A temperature of the laser diode at which the light output of the solid state laser is maximized is detected while changing the temperature of the laser diode, and the first temperature control circuit controls the temperature of the laser diode to the detected temperature. A temperature of the resonator at which the light output of the solid state laser is maximized is detected while changing the temperature of the resonator, and the second temperature control circuit controls the temperature of the resonator to the detected temperature.

17 Claims, 3 Drawing Sheets

LASER DRIVE METHOD, LASER DRIVE SYSTEM, AND RADIATION IMAGE READ-OUT APPARATUS

BACKGROUND OF THE INVENTION

1. Field of the Invention

This invention relates to a laser drive method and a laser drive system for controlling a light output of a laser diode pumped solid state laser, and more particularly to such a method and a system for restoring the light output of the laser diode pumped solid state laser upon receipt of a predetermined command. This invention further relates to a radiation image read-out apparatus provided with a stimulating light source driven by the laser drive system.

2. Description of the Related Art

As disclosed, for instance, in Japanese Unexamined Patent Publication No. 62(1987)-189783, there has been known a laser diode pumped solid state laser in which a solid state laser crystal doped with a rare-earth element such as neodymium is pumped by a light emitted from a laser diode. In such a solid state laser, it has been widely put into practice to dispose a nonlinear optical crystal in the resonator thereof in order to convert a solid laser beam (a laser beam emitted from the solid state laser crystal) to a second harmonic or a sum frequency, thereby obtaining a laser beam of a shorter wavelength. For example a solid state laser in which a second harmonic is taken out is generally referred to as "a SHG laser".

In the solid state lasers including those in which the wavelength of the laser beam emitted from the solid state laser crystal is converted, the temperatures of the laser diode, the solid state laser crystal and the resonator are generally controlled to predetermined temperatures in order to suppress fluctuation in the light output and the oscillation wavelength of the laser diode and further to keep a predetermined phase matching state at the nonlinear optical crystal in the case of the lasers where the wavelength conversion is effected. Such temperature control is generally effected by placing those elements on cooling surfaces of electronic cooling elements (Peltier elements), detecting the temperatures of the laser diode and the inside of the resonator and feedback-controlling the electronic cooling elements on the basis of the detected temperatures so that the temperatures of the cooling elements are kept at target temperatures. In order to keep constant the light output of the solid state laser, there generally carried out an automatic power control in addition to said temperature control.

Further since the solid state lasers are suitable for obtaining a high light output, they have been increasingly used as high power lasers. For example, they are used as a stimulating light source in a radiation image read-out apparatus disclosed, for instance, in U.S. Pat. Nos. 4,584,482 and 5,530,261, due to their high output powers. The radiation image read-out apparatus comprises a stimulating light projecting means which projects stimulating light onto a stimulable phosphor sheet on which a radiation image has been stored and a read-out means which detects light emitted from the stimulable phosphor sheet upon exposure to the stimulating light in proportion to the radiation energy stored thereon and reads out the radiation image stored on the stimulable phosphor sheet.

There is a phenomenon that the light output power of the solid state laser gradually reduces with time though the automatic power control is carried out. The reason of this phenomenon has not been found.

When the solid state laser is used as the stimulating light source in said radiation image read-out apparatus, reduction in the light output power of the stimulating light source directly leads to deterioration in the image quality and accordingly the phenomenon governs the performance of the apparatus. Therefore, not only search for the reason of the phenomenon has been made but also how to deal with the phenomenon has been searched.

SUMMARY OF THE INVENTION

In view of the foregoing observations and description, the primary object of the present invention is to provide a laser drive method and a laser drive system which can restore the light output power of the solid state laser when the light output power reduces with time.

Another object of the present invention is to provide a radiation image read-out apparatus provided with a stimulating light source driven by such a laser drive system.

We have found the following facts.

That is, so long as the current flowing through the laser diode is constant at a predetermined value, 1) the light output power of the solid state laser reduces with time when the temperatures of the laser diode and the resonator are constant at predetermined values, 2) the light output power of the solid state laser changes according to the temperatures of the laser diode and the resonator and at the same time there exist temperatures of the laser diode and the resonator at which the light output power of the solid state laser is maximized, and 3) the temperatures of the laser diode and the resonator at which the light output power of the solid state laser is maximized are not always equal to each other.

On the basis of the discovery, in the laser drive method and the laser drive system of the present invention, the light output power of the solid state laser is restored by readjusting the temperatures of the laser diode and the resonator to optical values when reduction of the light output power with time occurs.

That is, in accordance with a first aspect of the present invention, there is provided a laser drive method for controlling the light output of a laser diode pumped solid state laser in which a solid laser crystal is pumped by a laser beam emitted from a laser diode and which is provided with a first temperature control means which controls the temperature of the laser diode to a predetermined value and a second temperature control means which controls the temperature of the resonator of the solid state laser to a predetermined value, which method comprising the step of restoring the light output of the solid state laser by carrying out an automatic power control, for keeping the light output of the solid state laser at a reference output value, when the solid state laser is in a steady state, switching from the automatic power control to an automatic current control, for keeping the electric current flowing through the laser diode at a reference current value, upon receipt of a predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

The reference current value is preferably a current value substantially equivalent to the current value which flows through the laser diode just before receipt of said predetermined command.

In accordance with a second aspect of the present invention, there is provided a laser drive method for controlling the light output of a laser diode pumped solid state laser in which a solid laser crystal is pumped by a laser beam emitted from a laser diode and which is provided with a first temperature control means which controls the temperature of the laser diode to a predetermined value and a second temperature control means which controls the temperature of the resonator of the solid state laser to a predetermined value, which method comprising the step of restoring the light output of the solid state laser by carrying out an automatic power control, for keeping the light output of the solid state laser at a first reference output value, when the solid state laser is in a steady state, switching from the automatic power control to a diode automatic power control, for keeping the light output of the laser diode at a second reference output value, upon receipt of a predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

The second reference output value is preferably an output value substantially equivalent to the output value which the laser diode outputs just before receipt of said predetermined command.

It is preferred that after the light output of the solid state laser is restored, the automatic current control or the diode automatic power control be switched to the automatic power control for keeping the light output of the solid state laser with the first reference output value after resumption of the automatic power control set to a value substantially equivalent to the light output just before the switching.

In each of the methods described above, it is preferred that the predetermined command be issued every period of time, each time the solid state laser is started or when the light output of the solid state laser falls below a predetermined limit value.

In accordance with a third aspect of the present invention, there is provided a laser drive system which restores the light output of the solid state laser according to the method of the first aspect. That is, in accordance with the third aspect of the present invention, there is provided a laser drive system for controlling the light output of a laser diode pumped solid state laser in which a solid laser crystal is pumped by a laser beam emitted from a laser diode, which laser drive system comprising an automatic power control means which keeps the light output of the solid state laser at a reference output value, an automatic current control means which keeps the electric current flowing through the laser diode at a reference current value, a selection means which selectively operates one of the automatic power control means and the automatic current control means, a first temperature control means which controls the temperature of the laser diode to a predetermined value, a second temperature control means which controls the temperature of the resonator of the solid state laser to a predetermined value, and a light output restoring means which causes the selection means to operate the automatic power control means when the solid state laser is in a steady state and restores the light output of the solid state laser upon receipt of a predetermined command by causing the selection means to switch from the automatic power control means to the automatic current control means upon receipt of the predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

The reference current value at which the automatic current control means keeps the electric current flowing through the laser diode when it is operated by the selection means upon receipt of the predetermined command is preferably a current value substantially equivalent to the current value which flows through the laser diode just before receipt of said predetermined command.

In accordance with a fourth aspect of the present invention, there is provided a laser drive system which restores the light output of the solid state laser according to the method of the second aspect. That is, in accordance with the fourth aspect of the present invention, there is provided a laser drive system for controlling the light output of a laser diode pumped solid state laser in which a solid laser crystal is pumped by a laser beam emitted from a laser diode, which laser drive system comprising an automatic power control means which keeps the light output of the solid state laser at a first reference output value, a diode automatic power control means which keeps the light output of the laser diode at a second reference output value, a selection means which selectively operates one of the automatic power control means and the diode automatic power control means, a first temperature control means which controls the temperature of the laser diode to a predetermined value, a second temperature control means which controls the temperature of the resonator of the solid state laser to a predetermined value, and a light output restoring means which causes the selection means to operate the automatic power control means when the solid state laser is in a steady state and restores the light output of the solid state laser upon receipt of a predetermined command by causing the selection means to switch from the automatic power control means to the diode automatic power control means upon receipt of the predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

The second reference output value at which the diode automatic power control means keeps the light output of the laser diode when it is operated by the selection means upon receipt of the predetermined command is preferably an output value substantially equivalent to the output value which the laser diode outputs just before receipt of said predetermined command.

It is preferred that after the light output of the solid state laser is restored, the selection means switches the automatic current control means or the diode automatic power control means to the automatic power control means with the first reference output value after resumption of the automatic power control set to a value substantially equivalent to the light output just before the switching.

Preferably each of the systems described above is provided with a command means which automatically issues said predetermined command every period of time, each time the solid state laser is started or when the light output of the solid state laser falls below a predetermined limit value.

In accordance with a fifth aspect of the present invention, there is provided a radiation image read-out apparatus which comprises a stimulating light projecting means (e.g., a light beam scanning system) which projects stimulating light onto a stimulable phosphor sheet on which a radiation image has been stored and a read-out means which detects light emitted from the stimulable phosphor sheet upon exposure to the stimulating light in proportion to the radiation energy stored thereon and reads out the radiation image stored on the stimulable phosphor sheet, and is characterized in that said stimulating light projecting means includes a laser diode pumped solid state laser driven the laser drive system of the present invention.

In accordance with the present invention, even if the light output of the solid state laser deteriorates with time, the light output of the solid state laser can be easily restored by correcting the temperatures of the laser diode and the resonator to optimal values according to simple procedure described above. Further the correction can be carried out by a simple arrangement at low cost without using a special device. Further since the restored light output can be made optimal to a given condition, it can be expected that the light output can be stable for a certain time after the restoration.

Further when the predetermined command is automatically issued every period of time, each time the solid state laser is started or when the light output of the solid state laser falls below a predetermined limit value, the restoration process does not trouble the operator.

Further when a laser diode pumped solid state laser driven by the laser drive system of the present invention is used as stimulating light source in the aforesaid radiation image read-out apparatus, the radiation image can be stably read out since the light output of the stimulating light source is stable.

DESCRIPTION OF THE PREFERRED EMBODIMENTS

Figure 1:
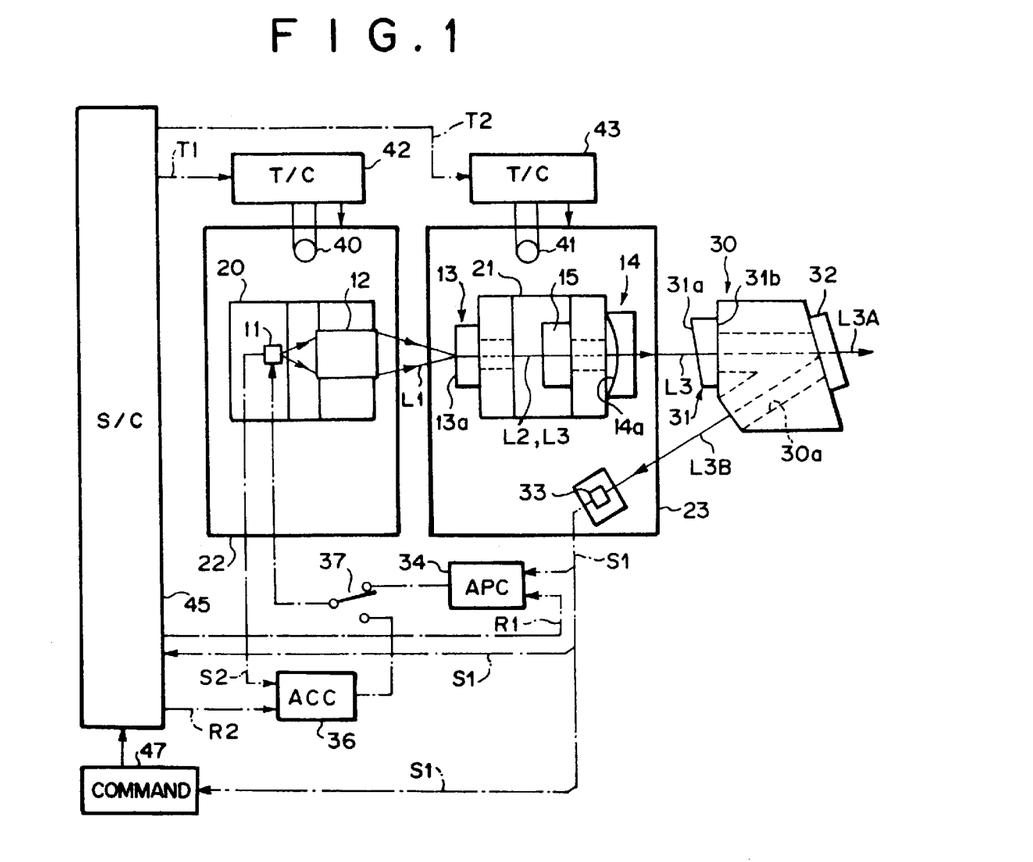
FIG. 1 is a schematic plan view showing a laser diode pumped solid state laser provided with a laser drive system in accordance with a first embodiment of the present invention.
Figure 2:
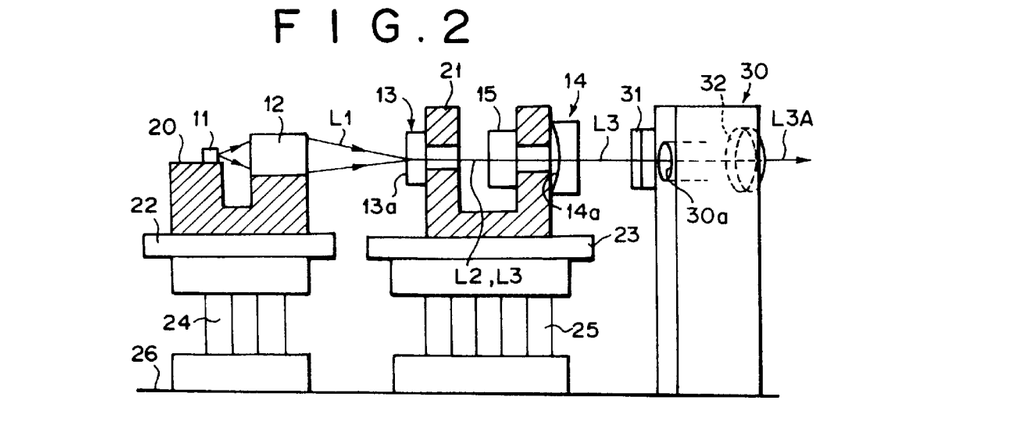
FIG. 2 is a side view partly in cross-section of the solid state laser shown in FIG. 1.

In FIGS. 1 and 2, a laser diode pumped solid state laser is driven by a laser drive system in accordance with a first embodiment of the present invention. The laser drive system carries out a sequence control for restoring the light output of the solid state laser upon receipt of a command output from a command means.

The solid state laser comprises a semiconductor laser chip 11 which emits a pumping laser beam L1, a condenser lens (e.g., a distributed refractive index type rod lens) 12 which condenses the pumping laser beam L1 which is a divergent light beam, a YAG crystal 13 which is a laser medium doped with neodymium (Nd), a resonator mirror 14 which is disposed forward (rightward as seen in FIGS. 1 and 2) of the YAG crystal 13, and a $KNbO_3$ crystal disposed between the resonator mirror 14 and the YAG crystal 13.

The pumping laser beam L1 emitted from the semiconductor laser 11 is 809 nm in wavelength. When the neodymium ions in the YAG crystal 13 is stimulated by the pumping laser beam L1, the YAG crystal 13 emits light of 946 nm. The end face 13a of the YAG crystal 13 through which the pumping laser beam L1 enters the YAG crystal 13 is provided with coating which well reflects light of 946 nm (reflectivity of at least 99.9%) and well transmits the pumping laser beam L1 of 809 nm (transmittance of at least 99%). The mirror surface 14a of the resonator mirror 14 is provided with coating which well reflects light of 946 nm and transmits light of 473 nm (to be described later). A Fabry-Pérot resonator is formed by the YAG crystal 13 and the resonator mirror 14, and light of 946 nm is confined between the surfaces 13a and 14a and generates laser oscillation. The laser beam L2 thus generated is converted to its second harmonic L3 of 473 nm by the $KNbO_3$ crystal and the second harmonic L3 mainly emanates through the resonator mirror 14. That is, the solid state laser is a SHG laser.

The semiconductor laser 11 and the condenser lens 12 are fixed to a holder 20 and the holder 20 is fixed to a reference plate 22. The reference plate 22 is formed of a material such as copper having a high thermal conductivity so that temperature gradient is hard to produce and is fixed to a Peltier element 24 which is fixed to a base 26 of the system. A thermistor 40 for temperature detection is fixed to the reference plate 22 and is connected to a temperature control circuit 42 which drives and controls the Peltier element 24. The temperature of the semiconductor laser 11 and the condenser lens 12 is detected by the thermistor 40 fixed to the reference plate 22. The temperature control circuit 42 is a feedback type temperature control circuit and controls the Peltier element 24 to keep the semiconductor laser 11 and the condenser lens 12 at a reference temperature T1 set by a sequence controller 45.

The YAG crystal 13 and the $KNbO_3$ crystal 15 which form the resonator are fixed to another holder 21 which is fixed to another reference plate 23. The reference plate 23 is also formed of a material such as copper having a high thermal conductivity so that temperature gradient is hard to produce and is fixed to another Peltier element 25 which is fixed to the base 26 of the system.

Another thermistor 41 is fixed to the reference plate 23 and is connected to another temperature control circuit 43 which drives and controls the Peltier element 25. The temperature of the resonator is detected by the thermistor 41 fixed to the reference plate 23. The temperature control circuit 43 is a feedback type temperature control circuit and controls the Peltier element 25 to keep the resonator at a reference temperature T2 set by the sequence controller 45.

The automatic power control of the output of the solid state laser will be described hereinbelow. A holder 30 is fixed to the base 26 separately from the reference plates 22 and 23 and the Peltier elements 24 and 25. A dichroic filter 31 and a half-silvered mirror 32 are fixed to the holder 30. The dichroic filter 31 cuts weak laser beams L1 and L2 which emanate through the resonator mirror 14 together with the second harmonic L3. The half-silvered mirror 32 is disposed at an angle to the direction of travel of the second harmonic L3 and transmits the major part of the second harmonic L3 as working light beam L3A while reflects a part of the second harmonic L3 as a detecting light beam L3B. The holder 30 is provided with a passage 30a through which the second harmonic L3 before divided by the half-silvered mirror 32 and the detecting light beam L3B reflected by the half-silvered mirror 32 travel.

The detecting light beam L3B is detected by a photodetector 33 for the automatic power control fixed to the reference plate 23 and the output signal S1 of the photodetector 33 is input into an automatic power control circuit 34. When a change-over switch (selection means) 37 is connected to the automatic power control circuit 34, the automatic power control circuit 34 controls the drive current to the semiconductor laser 11 so that the output signal S1 converges on a reference value R1 set by the sequence controller 45, whereby the output power of the laser beam L1 is controlled and the output power of the second harmonic L3 is stabled at a constant value.

The automatic current control of the semiconductor laser 11 will be described, hereinbelow. The amount of current flowing to the semiconductor laser 11 is detected by a current detecting means (not shown) such as a detecting resistor connected to the semiconductor laser 11, and the output signal of the current detecting means is input into an automatic current control circuit 36. When the change-over switch 37 is connected to the automatic current control circuit 36, the automatic current control circuit 36 controls the drive current to the semiconductor laser 11 so that the output signal S2 converges on a reference value R2 set by the sequence controller 45, whereby the amount of the electric current to the laser beam L1 is controlled to a constant value and the second harmonic L3 is obtained according to the electric current supplied to the laser beam L1. Accordingly the output power of the second harmonic L3 is stabled though not so stable as that obtained by the automatic power control.

The method of restoring the output power of the solid state laser will be described hereinbelow. The sequence controller 45 connects the change-over switch 37 to the automatic power control circuit 34, thereby controlling the output of the second harmonic L3 to a constant value by the automatic power control until the sequence controller 45 receives a predetermined command.

When the output power of the second harmonic L3 is lowered and the predetermined command is issued, the sequence controller 45 begins an output restoration processing to be described later. The predetermined command may be issued manually by the operator or may be automatically issued. For example, a command means 47 may issue the command when the output signal S1 lowers below a predetermined lower limit while monitoring the output signal, or every time the solid state laser is started or every predetermined period by use of a timer.

The output restoration processing is performed in the following manner under the control of the sequence controller 45. Upon receipt of the predetermined command, the sequence controller 45 switches the change-over switch 37 to the automatic current control circuit 36. At this time, the sequence controller 45 sets said reference value R2 to a value which is substantially equivalent to the current value which flows to the semiconductor laser 11 just before the receipt of the command.

Then the sequence controller 45 raises or lowers the reference temperature T1 little by little, thereby causing the temperature control circuit 42 to gradually change the temperature of the semiconductor laser 11 and the condenser lens 12. At the same time, the sequence controller 45 monitors the output signal S1, i.e., the output power of the second harmonic L3 and searches a temperature T1m at which the output signal S1 is maximized. When such a temperature T1m cannot be found by simply raising or lowering the reference temperature T1, the reference temperature T1 is changed in the reverse direction. Then the reference temperature T1 is replaced with the temperature T1m and the temperature control circuit 42 controls the temperature of the semiconductor laser 11 and the condenser lens 12 to the temperature T1m.

Then the sequence controller 45 raises or lowers the reference temperature T2 little by little, thereby causing the temperature control circuit 43 to gradually change the temperature of the resonator. At the same time, the sequence controller 45 monitors the output signal S1, i.e., the output power of the second harmonic L3 and searches a temperature T2m at which the output signal S1 is maximized. When such a temperature T2m cannot be found by simply raising or lowering the reference temperature T2, the reference temperature T2 is changed in the reverse direction. Then the reference temperature T2 is replaced with the temperature T2m and the temperature control circuit 43 controls the temperature of the resonator to the temperature T2m. In this manner, the temperatures of the semiconductor laser 11, the condenser lens 12 and the resonator are controlled so that the output power of the second harmonic L3 is maximized, thereby restoring the light output power of the solid state laser.

After the output power of the second harmonic L3 is restored, the sequence controller 45 switches the change-over switch 37 to the automatic power control circuit 34. At this time, the sequence controller 45 sets said reference value R1 to a value which is substantially equivalent to the output signal S1 just before the change-over switch 37 is switched to the automatic power control circuit 34. Thus the output power of the second harmonic L3 is controlled to the restored value by the automatic power control.

The output power of the second harmonic L3 is restored by the restoration processing described above and thereafter a constant light intensity can be obtained for a while.

Figure 3:
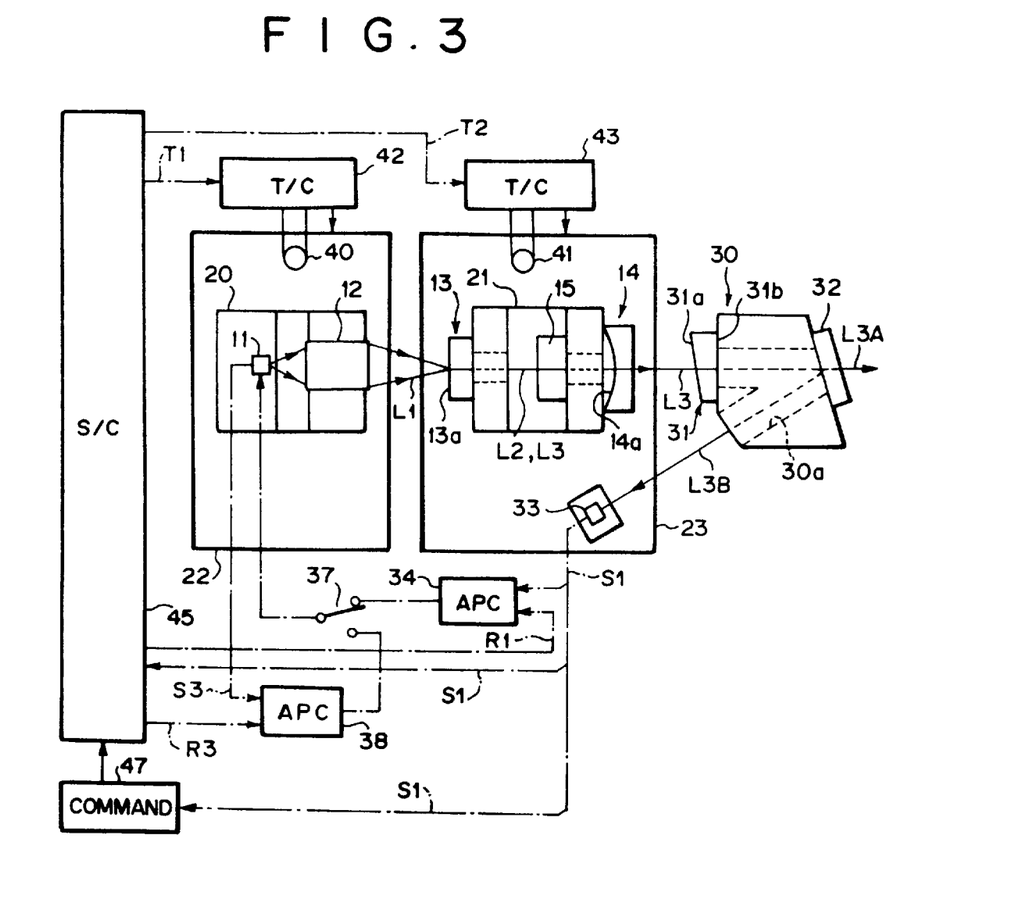
FIG. 3 is a schematic plan view showing a laser diode pumped solid state laser provided with a laser drive system in accordance with a second embodiment of the present invention.
Figure 4:
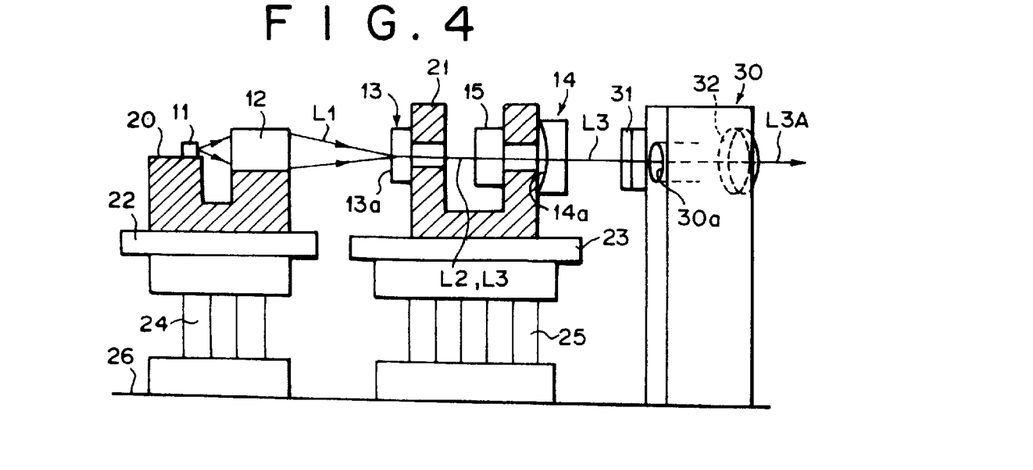
FIG. 4 is a side view partly in cross-section of the solid state laser shown in FIG. 3.

A laser drive system in accordance with a second embodiment of the present invention will be described with reference to FIGS. 3 and 4, hereinbelow. In FIGS. 3 and 4, the elements analogous to those shown in FIGS. 1 and 2 are given the same reference numerals and will not be described here. The laser drive system carries out a sequence control for restoring the light output of the solid state laser upon receipt of a command output from a command means.

The laser drive system of the second embodiment differs from that of the first embodiment in that an automatic power control circuit 56 for stabling the output power of the semiconductor laser 11 (different from the automatic power control circuit 34 for stabling the output power of the second harmonic L3) is employed in place of the automatic current control circuit 36 for the semiconductor laser 11.

The automatic power control of the semiconductor laser 11 will be described, hereinbelow. A photodetector such as a photodiode is contained in the package in which the semiconductor laser 11 is contained, and the amount of the laser beam L1 is detected by the photodetector and the output signal S3 of the photodetector is input into the automatic power control circuit 56. When the change-over switch 37 is connected to the automatic power control circuit 56, the automatic power control circuit 56 controls the drive current to the semiconductor laser 11 so that the output signal S3 converges on a reference value R3 set by the sequence controller 45, whereby the output power of the laser beam L1 is controlled to a constant value.

The method of restoring the output power of the solid state laser in the second embodiment will be described hereinbelow. The sequence controller 45 connects the change-over switch 37 to the automatic power control circuit 34, thereby controlling the output of the second harmonic L3 to a constant value by the automatic power control until the sequence controller 45 receives a predetermined command.

When the output power of the second harmonic L3 is lowered and the predetermined command is issued, the sequence controller 45 begins an output restoration processing in the following manner.

Upon receipt of the predetermined command, the sequence controller 45 switches the change-over switch 37 to the automatic current control circuit 56. At this time, the sequence controller 45 sets said reference value R3 to a value which is substantially equivalent to the output signal S3 just before the change-over switch 37 is switched to the automatic power control circuit 56.

Then the sequence controller 45 raises or lowers the reference temperature T1 little by little, thereby causing the temperature control circuit 42 to gradually change the temperature of the semiconductor laser 11 and the condenser lens 12. At the same time, the sequence controller 45 monitors the output signal S1, i.e., the output power of the second harmonic L3 and searches a temperature T1m at which the output signal S1 is maximized. When such a temperature T1m cannot be found by simply raising or lowering the reference temperature T1, the reference temperature T1 is changed in the reverse direction. Then the reference temperature T1 is replaced with the temperature T1m and the temperature control circuit 42 controls the temperature of the semiconductor laser 11 and the condenser lens 12 to the temperature T1m.

Then the sequence controller 45 raises or lowers the reference temperature T2 little by little, thereby causing the temperature control circuit 43 to gradually change the temperature of the resonator. At the same time, the sequence controller 45 monitors the output signal S1, i.e., the output power of the second harmonic L3 and searches a temperature T2m at which the output signal S1 is maximized. When such a temperature T2m cannot be found by simply raising or lowering the reference temperature T2, the reference temperature T2 is changed in the reverse direction. Then the reference temperature T2 is replaced with the temperature T2m and the temperature control circuit 43 controls the temperature of the resonator to the temperature T2m. In this manner, the temperatures of the semiconductor laser 11, the condenser lens 12 and the resonator are controlled so that the output power of the second harmonic L3 is maximized, thereby restoring the light output power of the solid state laser.

After the output power of the second harmonic L3 is restored, the sequence controller 45 switches the change-over switch 37 to the automatic power control circuit 34. At this time, the sequence controller 45 sets said reference value R1 to a value which is substantially equivalent to the output signal S1 just before the change-over switch 37 is switched to the automatic power control circuit 34. Thus the output power of the second harmonic L3 is controlled to the restored value by the automatic power control.

The output power of the second harmonic L3 is restored by the restoration processing described above and thereafter a constant light intensity can be obtained for a while.

Figure 5:
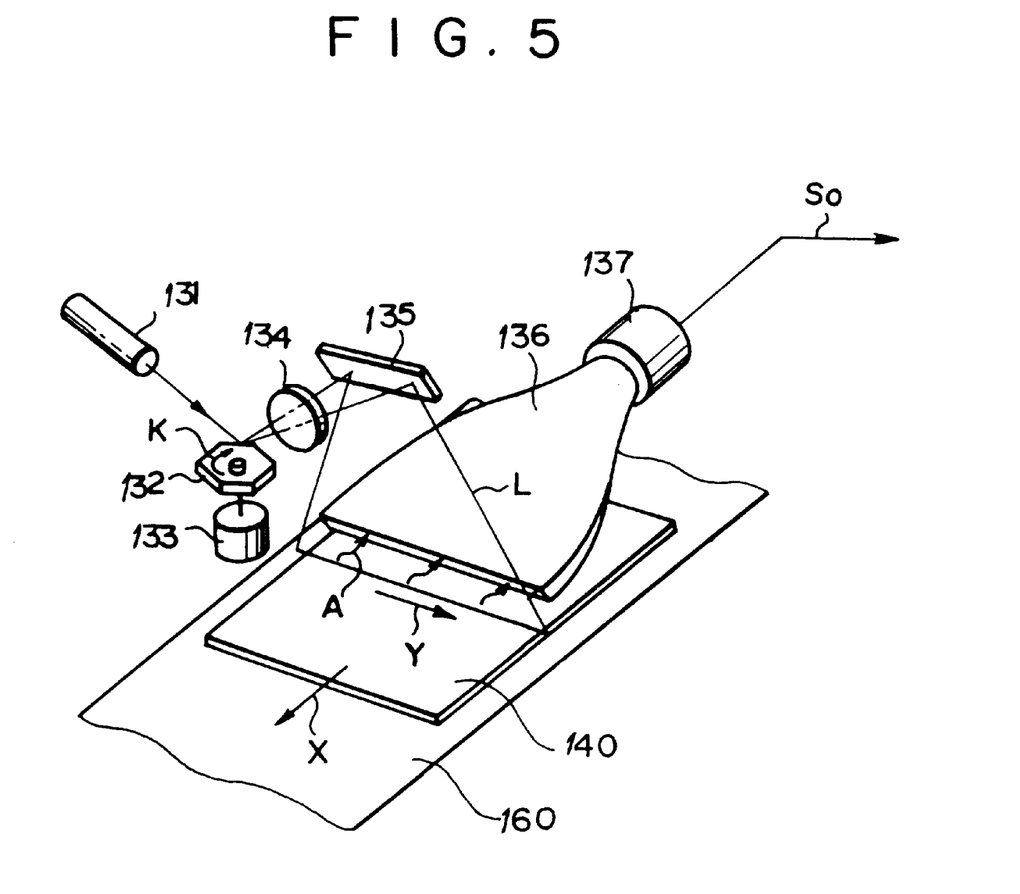
FIG. 5 is a schematic view showing a light beam scanning system provided with a laser which is driven by the laser drive system of the present invention.

A solid state laser driven by the laser drive system of the present invention is useful for, for instance, a radiation image read-out apparatus such as disclosed in U.S. Pat. No. 5,530,261. An example of an image read-out section of such a radiation image read-out apparatus will be briefly described with reference to FIG. 5, hereinbelow. As shown in FIG. 5, the image read-out section is provided with a light beam scanning system having a laser 131 driven by the drive system of the present invention.

That is, the light beam scanning system comprises a laser 131, which is driven by the drive system of the present invention and emits a laser beam L of a predetermined wavelength, a rotating polygonal mirror 132 which deflects the laser beam L, a motor 133 which drives the rotating polygonal mirror 132, an fθ lens 134 which condenses the laser beam L and a reflecting optical system 135 which reflects the condensed laser beam L to impinge upon a stimulable phosphor sheet 140. When exposed to the laser beam L, the stimulable phosphor sheet 140 emits light A in proportion to the radiation energy stored thereon. The light A emitted by the stimulable phosphor sheet 140 is guided to a photomultiplier 137 by an optical guide 136 and the photomultiplier 137 converts the light A to an electric image signal representing a radiation image stored on the stimulable phosphor sheet 140.

The stimulable phosphor sheet 140 is placed on a conveyor means 160 and is conveyed in the direction of arrow X to the image read-out section. In the image read-out section, the laser beam L emitted from the laser 131 is deflected by the rotating polygonal mirror 132 which is rotated in the direction of arrow K at a high speed by the motor 133. The deflected laser beam L is condensed by the fθ lens 134 and is reflected by the reflecting optical system 135 to impinge upon the stimulable phosphor sheet 140. Due to rotation of the polygonal mirror 32 in the direction of arrow K, the laser beam L scans the stimulable phosphor sheet 140 in the direction of arrow Y (main scanning) while the stimulable phosphor sheet 140 is conveyed in the direction of arrow X (sub-scanning), whereby the laser beam L two-dimensionally scans the stimulable phosphor sheet 140.

When exposed to the laser beam L, the stimulable phosphor sheet 140 emits light A in proportion to the radiation energy stored thereon. The light A emitted by the stimulable phosphor sheet 140 is guided to a photomultiplier 137 by an optical guide 36 and the photomultiplier 137 amplifies the light A and converts it to an electric image signal So representing a radiation image stored on the stimulable phosphor sheet 140.

What is claimed is:

1. A laser drive method for controlling the light output of a laser diode pumped solid state laser in which a solid laser crystal is pumped by a laser beam emitted from a laser diode and which is provided with a first temperature control means which controls the temperature of the laser diode to a predetermined value and a second temperature control means which controls the temperature of the resonator of the solid state laser to a predetermined value, which method comprising the step of restoring the light output of the solid state laser by carrying out an automatic power control, for keeping the light output of the solid state laser at a reference output value, when the solid state laser is in a steady state, switching from the automatic power control to an automatic current control, for keeping the electric current flowing through the laser diode at a reference current value, upon receipt of a predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

2. A laser drive method as defined in claim 1 in which said reference current value is set to a current value substantially equivalent to the current value which flows through the laser diode just before receipt of said predetermined command.

3. A laser drive method as defined in claim 1 further comprising a step of switching the automatic current control to the automatic power control after the light output of the solid state laser is restored with said reference output value set to a value substantially equivalent to the light output just before the automatic current control is switched to the automatic power control.

4. A laser drive method as defined in claim 1 in which said predetermined command is issued every period of time, each time the solid state laser is started or when the light output of the solid state laser falls below a predetermined limit value.

5. A laser drive method for controlling the light output of a laser diode pumped solid state laser in which a solid laser crystal is pumped by a laser beam emitted from a laser diode and which is provided with a first temperature control means which controls the temperature of the laser diode to a predetermined value and a second temperature control means which controls the temperature of the resonator of the solid state laser to a predetermined value, which method comprising the step of restoring the light output of the solid state laser by carrying out an automatic power control, for keeping the light output of the solid state laser at a first reference output value, when the solid state laser is in a steady state, switching from the automatic power control to a diode automatic power control, for keeping the light output of the laser diode at a second reference output value, upon receipt of a predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

6. A laser drive method as defined in claim 5 in which said second reference output value is set to an output value substantially equivalent to the output value which the laser diode outputs just before receipt of said predetermined command.

7. A laser drive method as defined in claim 5 further comprising a step of switching the diode automatic power control to the automatic power control after the light output of the solid state laser is restored with said first reference output value set to a value substantially equivalent to the light output just before the diode automatic power control is switched to the automatic power control.

8. A laser drive method as defined in claim 5 in which said predetermined command is issued every period of time, each time the solid state laser is started or when the light output of the solid state laser falls below a predetermined limit value.

9. A laser drive system for controlling the light output of a laser diode pumped solid state laser in which a solid laser crystal is pumped by a laser beam emitted from a laser diode, which laser drive system comprising an automatic power control means which keeps the light output of the solid state laser at a reference output value, an automatic current control means which keeps the electric current flowing through the laser diode at a reference current value, a selection means which selectively operates one of the automatic power control means and the automatic current control means, a first temperature control means which controls the temperature of the laser diode to a predetermined value, a second temperature control means which controls the temperature of the resonator of the solid state laser to a predetermined value, and a light output restoring means which causes the selection means to operate the automatic power control means when the solid state laser is in a steady state and restores the light output of the solid state laser upon receipt of a predetermined command by causing the selection means to switch from the automatic power control means to the automatic current control means upon receipt of the predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

10. A laser drive system as defined in claim 9 in which said reference current value at which the automatic current control means keeps the electric current flowing through the laser diode when it is operated by the selection means upon receipt of the predetermined command is a current value substantially equivalent to the current value which flows through the laser diode just before receipt of said predetermined command.

11. A laser drive system as defined in claim 9 in which the selection means switches the automatic current control means to the automatic power control means after the light output of the solid state laser is restored with the reference output value set to a value substantially equivalent to the light output just before the switching.

12. A laser drive system as defined in claim 9 further comprising a command means which automatically issues said predetermined command every period of time, each time the solid state laser is started or when the light output of the solid state laser falls below a predetermined limit value.

13. A laser drive system for controlling the light output of a laser diode pumped solid state laser in which a solid laser crystal is pumped by a laser beam emitted from a laser diode, which laser drive system comprising an automatic power control means which keeps the light output of the solid state laser at a first reference output value, a diode automatic power control means which keeps the light output of the laser diode at a second reference output value, a selection means which selectively operates one of the automatic power control means and the diode automatic power control means, a first temperature control means which controls the temperature of the laser diode to a predetermined value, a second temperature control means which controls the temperature of the resonator of the solid state laser to a predetermined value, and a light output restoring means which causes the selection means to operate the automatic power control means when the solid state laser is in a steady state and restores the light output of the solid state laser upon receipt of a predetermined command by causing the selection means to switch from the automatic power control means to the diode automatic power control means upon receipt of the predetermined command, detecting a temperature of the laser diode at which the light output of the solid state laser is maximized while causing the first temperature control means to change the temperature of the laser diode, causing the first temperature control means to control the temperature of the laser diode to the detected temperature, detecting a temperature of the resonator at which the light output of the solid state laser is maximized while causing the second temperature control means to change the temperature of the resonator, and causing the second temperature control means to control the temperature of the resonator to the detected temperature.

14. A laser drive system as defined in claim 13 in which second reference output value at which the diode automatic power control means keeps the light output of the laser diode when it is operated by the selection means upon receipt of the predetermined command is preferably an output value substantially equivalent to the output value which the laser diode outputs just before receipt of said predetermined command.

15. A laser drive system as defined in claim 13 in which the selection means switches the diode automatic power control means to the automatic power control means after the light output of the solid state laser is restored with the first reference output value set to a value substantially equivalent to the light output just before the switching.

16. A laser drive system as defined in claim 13 further comprising a command means which automatically issues said predetermined command every period of time, each time the solid state laser is started or when the light output of the solid state laser falls below a predetermined limit value.

17. A radiation image read-out apparatus comprising a stimulating light projecting means which projects stimulating light beam onto a stimulable phosphor sheet on which a radiation image has been stored and a read-out means which detects light emitted from the stimulable phosphor sheet upon exposure to the stimulating light in proportion to the radiation energy stored thereon and reads out the radiation image stored on the stimulable phosphor sheet, wherein the improvement comprises that the stimulating light projecting means is provided with a stimulating light source driven by a laser drive system as defined in any one of claims 9 to 16.

* * * * *